US012341300B2

(12) United States Patent
Guo et al.

(10) Patent No.: US 12,341,300 B2
(45) Date of Patent: Jun. 24, 2025

(54) ELECTRICAL CONNECTOR AND ASSEMBLY THEREOF WITH IMPROVED SHIELDING EFFECT

(71) Applicant: DONGGUAN LUXSHARE TECHNOLOGIES CO., LTD, Dongguan (CN)

(72) Inventors: Rongzhe Guo, Dongguan (CN); Xiaogang Liu, Dongguan (CN); Xiaoping Wu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 415 days.

(21) Appl. No.: 18/098,283

(22) Filed: Jan. 18, 2023

(65) Prior Publication Data

US 2023/0402798 A1 Dec. 14, 2023

(30) Foreign Application Priority Data

Jun. 10, 2022 (CN) ......................... 202210655389.8

(51) Int. Cl.

*H01R 13/6582* (2011.01)
*H01R 12/72* (2011.01)
*H01R 13/506* (2006.01)

(52) U.S. Cl.

CPC ....... *H01R 13/6582* (2013.01); *H01R 12/724* (2013.01); *H01R 13/506* (2013.01)

(58) Field of Classification Search

None
See application file for complete search history.

(56) References Cited

U.S. PATENT DOCUMENTS 12,283,779 B2 * 4/2025 Lee ...................... H01R 13/405
2012/0315796 A1 * 12/2012 Pang ................. H01R 13/6471 29/874
2018/0034196 A1 2/2018 Liu
2019/0214755 A1 7/2019 Manickam
2020/0194941 A1 6/2020 Chen
(Continued)

FOREIGN PATENT DOCUMENTS

CN 209516106 U 10/2019
CN 111682369 A 9/2020
(Continued)

*Primary Examiner* — Oscar C Jimenez
(74) *Attorney, Agent, or Firm* — Birch, Stewart, Kolasch & Birch, LLP

(57) ABSTRACT

An electrical connector includes an insulating body, a terminal module and a shielding piece. The terminal module includes an insulating block and a number of conductive terminals. Each conductive terminal includes a mating elastic arm. The number of conductive terminals include a first signal terminal, a second signal terminal, a first ground terminal, and a second ground terminal. The shielding piece includes a base portion, an elastic arm portion and an abutting portion. The base portion includes a first fixing portion fixed to the first ground terminal, and a second fixing portion fixed to the second ground terminal. The abutting portion includes a first abutting portion floating in abutment against the mating elastic arm of the first ground terminal, and a second abutting portion floating in abutment against the mating elastic arm of the second ground terminal.

20 Claims, 19 Drawing Sheets

(56) References Cited

U.S. PATENT DOCUMENTS

| | | | | |
|---|---|---|---|---|
| 2023/0268679 | A1* | 8/2023 | Little | H01R 13/41<br>439/95 |
| 2024/0222892 | A1* | 7/2024 | Yao | H01R 12/62 |

FOREIGN PATENT DOCUMENTS

| | | | |
|---|---|---|---|
| CN | 109962353 | B | 10/2020 |
| CN | 113285309 | A | 8/2021 |
| CN | 114256660 | A | 3/2022 |
| TW | 202013825 | A | 4/2020 |
| WO | WO 2017/075763 | A1 | 5/2017 |

* cited by examiner

ELECTRICAL CONNECTOR AND ASSEMBLY THEREOF WITH IMPROVED SHIELDING EFFECT

CROSS-REFERENCE TO RELATED APPLICATION

This patent application claims priority of a Chinese Patent Application No. 202210655389.8, filed on Jun. 10, 2022 and titled “ELECTRICAL CONNECTOR”, the entire content of which is incorporated herein by reference.

TECHNICAL FIELD

The present disclosure relates to an electrical connector and an assembly thereof, which belongs to a technical field of connectors.

BACKGROUND

With the continuous improvement of the signal integrity (SI) requirements of electronic equipment, this also brings a lot of challenges to the design of electrical connectors themselves.

An electrical connector in the related art generally includes an insulating body, a plurality of conductive terminals, and a shielding piece. Each of the conductive terminals includes a body portion, a mating elastic arm extending from the body portion, and a tail portion extending from the body portion. The plurality of conductive terminals typically include a signal terminal and a ground terminal. The shielding piece is in contact with the body portion of the ground terminal so as to improve the shielding effect.

However, when the electrical connector is matched with a mating module, and when the signal is transmitted in the electrical connector, the shielding effect, especially at the position of the mating elastic arm, often plays an important role.

Therefore, it is necessary to improve the existing electrical connectors.

SUMMARY

An object of the present disclosure is to provide an electrical connector and an assembly thereof with improved shielding effect.

In order to achieve the above object, the present disclosure adopts the following technical solution: an electrical connector, including: an insulating body including a mating surface and a mating slot extending through the mating surface; a terminal module including an insulating block and a plurality of conductive terminals fixed to the insulating block, the insulating block including a mounting groove, each conductive terminal including a mating elastic arm extending beyond the insulating block so as to extend into the mating slot, the plurality of conductive terminals including a first signal terminal, a second signal terminal, a first ground terminal located on one side of the first signal terminal and adjacent to the first signal terminal, and a second ground terminal located on another side of the second signal terminal and adjacent to the second signal terminal, the first signal terminal and the second signal terminal forming a differential pair signal terminals, the differential pair signal terminals are located between the first ground terminal and the second ground terminal, the first ground terminal including a first body portion exposed in the mounting groove, the second ground terminal including a second body portion exposed in the mounting groove; and a shielding piece including a base portion, an elastic arm portion extending from the base portion, and an abutting portion connected with the elastic arm portion, the base portion being at least partially received in the mounting groove, the base portion including a first fixing portion fixed to the first body portion of the first ground terminal, a second fixing portion fixed to the second body portion of the second ground terminal, and a raised portion connecting the first fixing portion and the second fixing portion, the raised portion being spanned over the first signal terminal and the second signal terminal so that the raised portion is not in contact with the first signal terminal and the second signal terminal, the elastic arm portion at least partially extending beyond the insulating block, the abutting portion includes a first abutting portion floating in abutment against the mating elastic arm of the first ground terminal, and a second abutting portion floating in abutment against the mating elastic arm of the second ground terminal; the elastic arm portion, the first abutting portion and the second abutting portion are deformable with the deformation of the mating elastic arm of the first ground terminal and the mating elastic arm of the second ground terminal.

In order to achieve the above object, the present disclosure adopts the following technical solution: an electrical connector assembly, including: an electrical connector, including: an insulating body including a mating surface and a mating slot extending through the mating surface; a terminal module including an insulating block and a plurality of conductive terminals fixed to the insulating block, the insulating block including a mounting groove, each conductive terminal including a mating elastic arm extending beyond the insulating block so as to extend into the mating slot, the plurality of conductive terminals including a first signal terminal, a second signal terminal, a first ground terminal located on one side of the first signal terminal and adjacent to the first signal terminal, and a second ground terminal located on another side of the second signal terminal and adjacent to the second signal terminal, the first signal terminal and the second signal terminal forming a differential pair signal terminals, the differential pair signal terminals are located between the first ground terminal and the second ground terminal, the first ground terminal including a first body portion exposed in the mounting groove, the second ground terminal including a second body portion exposed in the mounting groove; and a shielding piece including a base portion, an elastic arm portion and an abutting portion connected with the elastic arm portion, the base portion being at least partially received in the mounting groove, the base portion including a first fixing portion fixed to the first body portion of the first ground terminal, a second fixing portion fixed to the second body portion of the second ground terminal, and a raised portion connecting the first fixing portion and the second fixing portion, the raised portion being spanned over the first signal terminal and the second signal terminal so that the raised portion is not in contact with the first signal terminal and the second signal terminal, the elastic arm portion at least partially extending beyond the insulating block, the abutting portion includes a first abutting portion floating in abutment against the mating elastic arm of the first ground terminal, and a second abutting portion floating in abutment against the mating elastic arm of the second ground terminal; and a mating module including a plurality of mating conductive pads; when the mating module is inserted into the mating slot, the mating conductive pads abut against the mating elastic arms of the conductive terminals; wherein the elastic arm portion, the first abutting portion and the second abutting portion are deformable with the deformation of the mating elastic arm of the first ground terminal and the mating elastic arm of the second ground terminal.

The shielding piece of the present disclosure is provided with the first fixing portion fixed to the first body portion of the first ground terminal and the second fixing portion fixed to the second body portion of the second ground terminal, thereby improving the shielding of the differential pair signal terminals in areas corresponding to the first body portion and the second body portion. In addition, the abutting portion of the shielding piece includes the first abutting portion floating in abutment against the mating elastic arm of the first ground terminal and the second abutting portion floating in abutment against the mating elastic arm of the second ground terminal, thereby strengthening the shielding of the differential pair signal terminals in the area corresponding to the mating elastic arms. Compared with the prior art, the shielding piece of the present disclosure can provide a shielding section covering a longer distance, thereby improving the shielding effect. In addition, the elastic arm portion, the first abutting portion and the second abutting portion is deformable according to the deformation of the mating elastic arm of the first ground terminal and the mating elastic arm of the second ground terminal, without affecting the mating of the electrical connector and a mating module.

DETAILED DESCRIPTION

Figure 1:
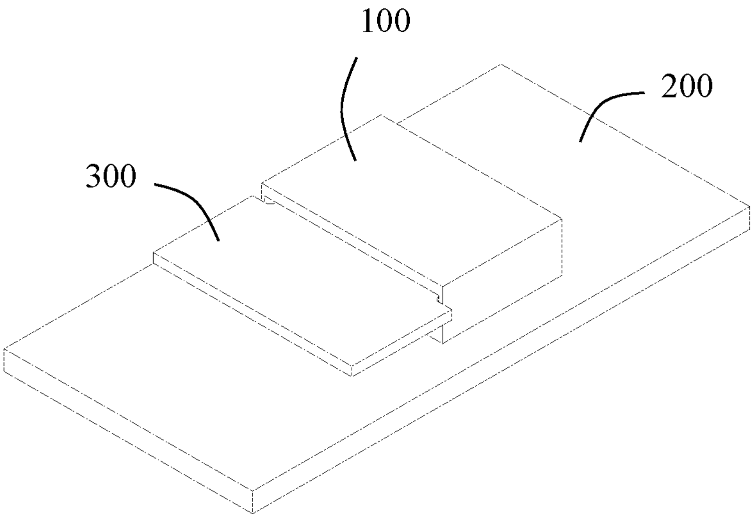
FIG. 1 is a schematic perspective view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
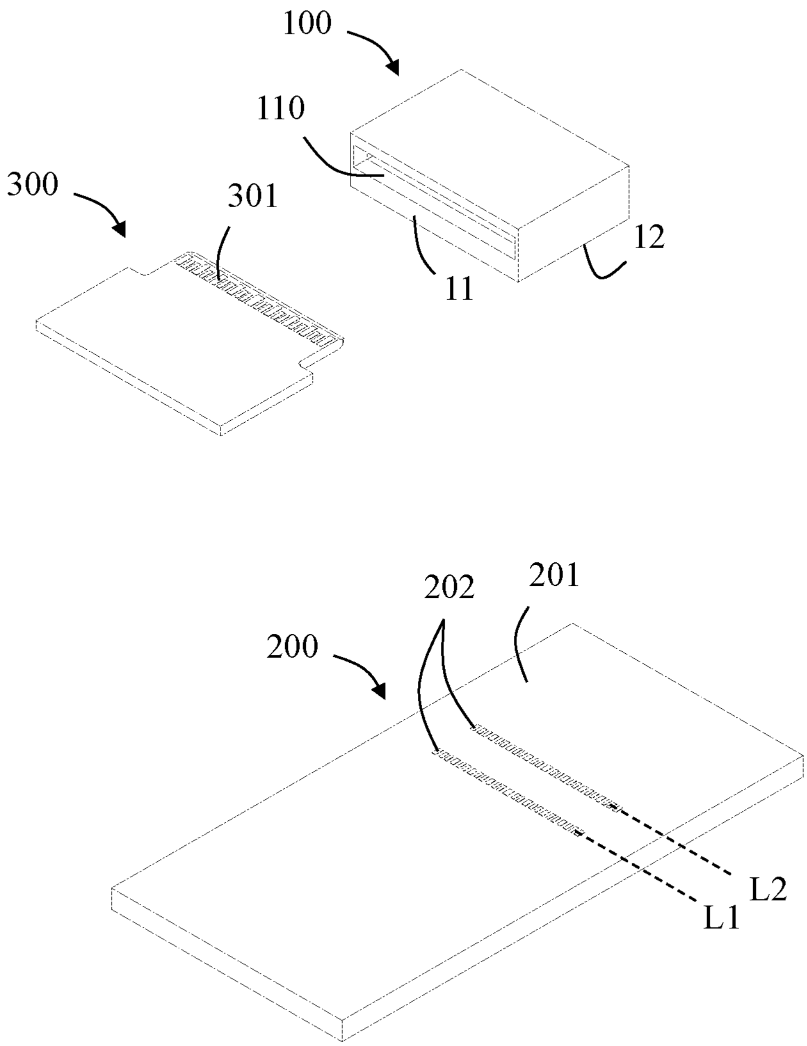
FIG. 2 is a partial perspective exploded view of FIG. 1.

Referring to FIGS. 1 and 2, the present disclosure discloses an electrical connector assembly which includes a circuit board 200, an electrical connector 100 mounted on the circuit board 200, and a mating module 300 for mating with the electrical connector 100.

Referring to FIG. 2, in an embodiment shown in the present disclosure, the circuit board 200 includes an upper surface 201 and a plurality of soldering pads 202 located on the upper surface. The plurality of soldering pads 202 are arranged in a first row L1 and a second row L2 which are parallel to each other.

Figure 3:
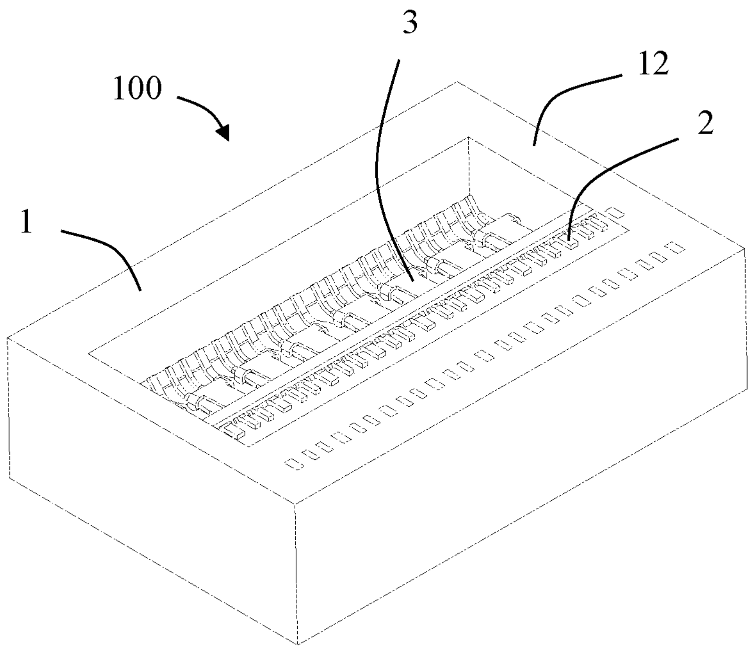
FIG. 3 is a perspective view of the electrical connector in FIG. 2 from another angle.
Figure 4:
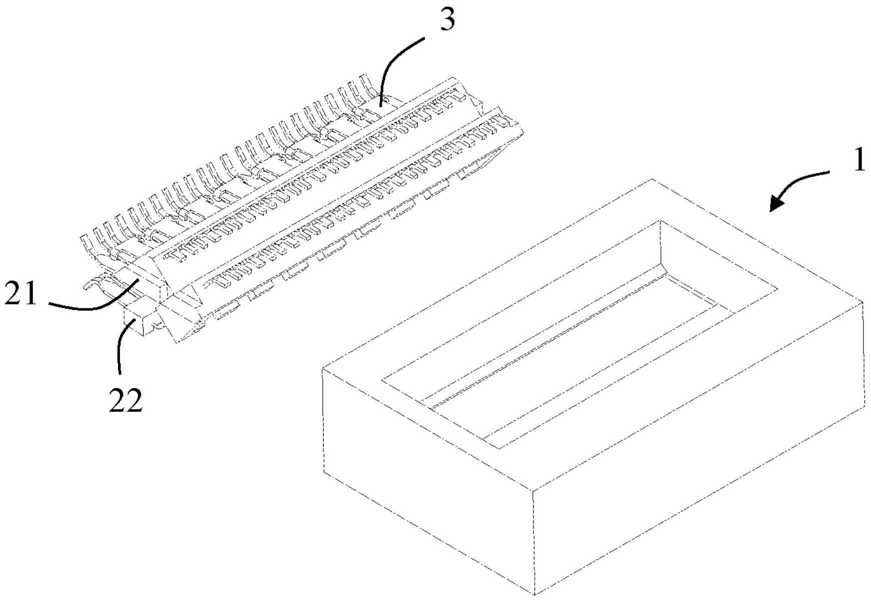
FIG. 4 is a partial perspective exploded view of FIG. 3.
Figure 5:
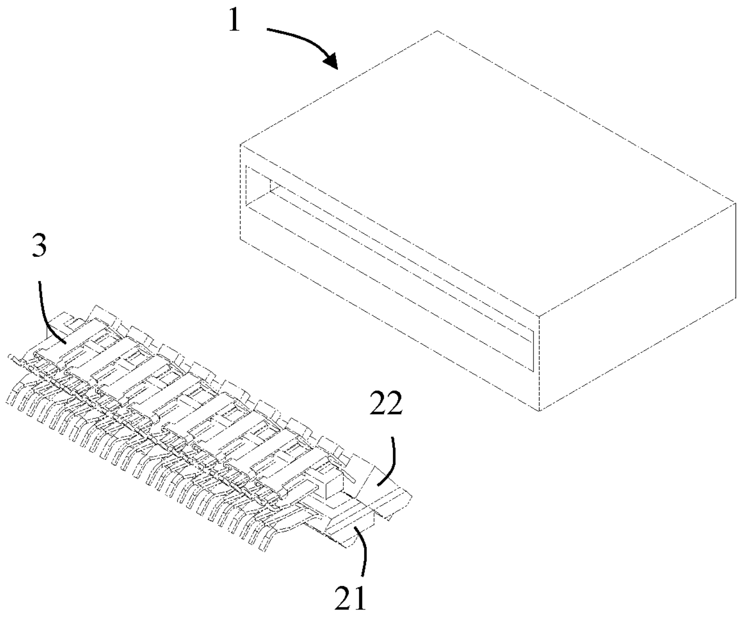
FIG. 5 is a partial perspective exploded view of FIG. 4 from another angle.
Figure 6:
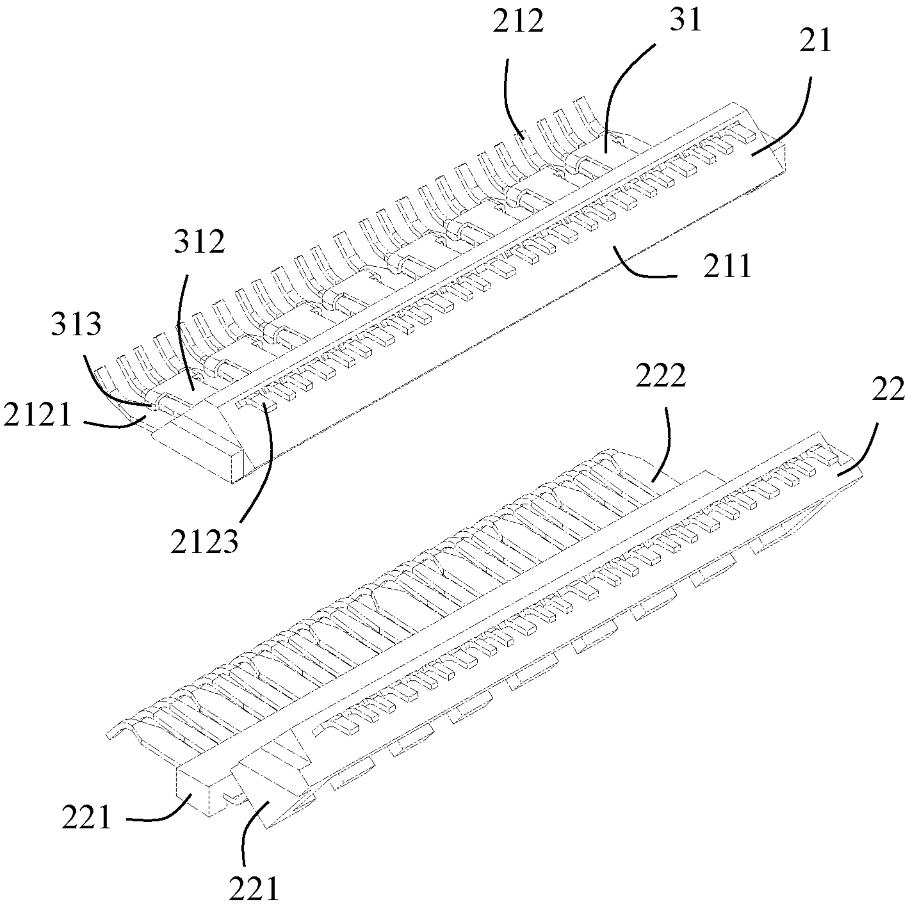
FIG. 6 is a perspective view of a terminal module and a shielding piece in FIG. 5.
Figure 7:
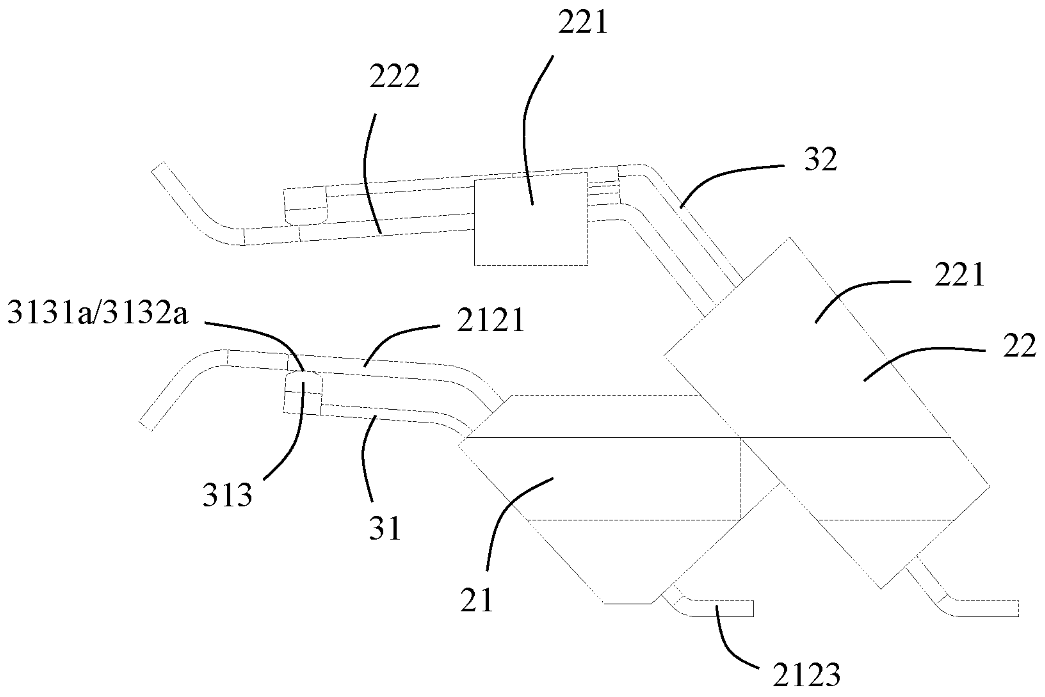
FIG. 7 is a side view of the terminal module and the shielding piece in FIG. 4.
Figure 8:
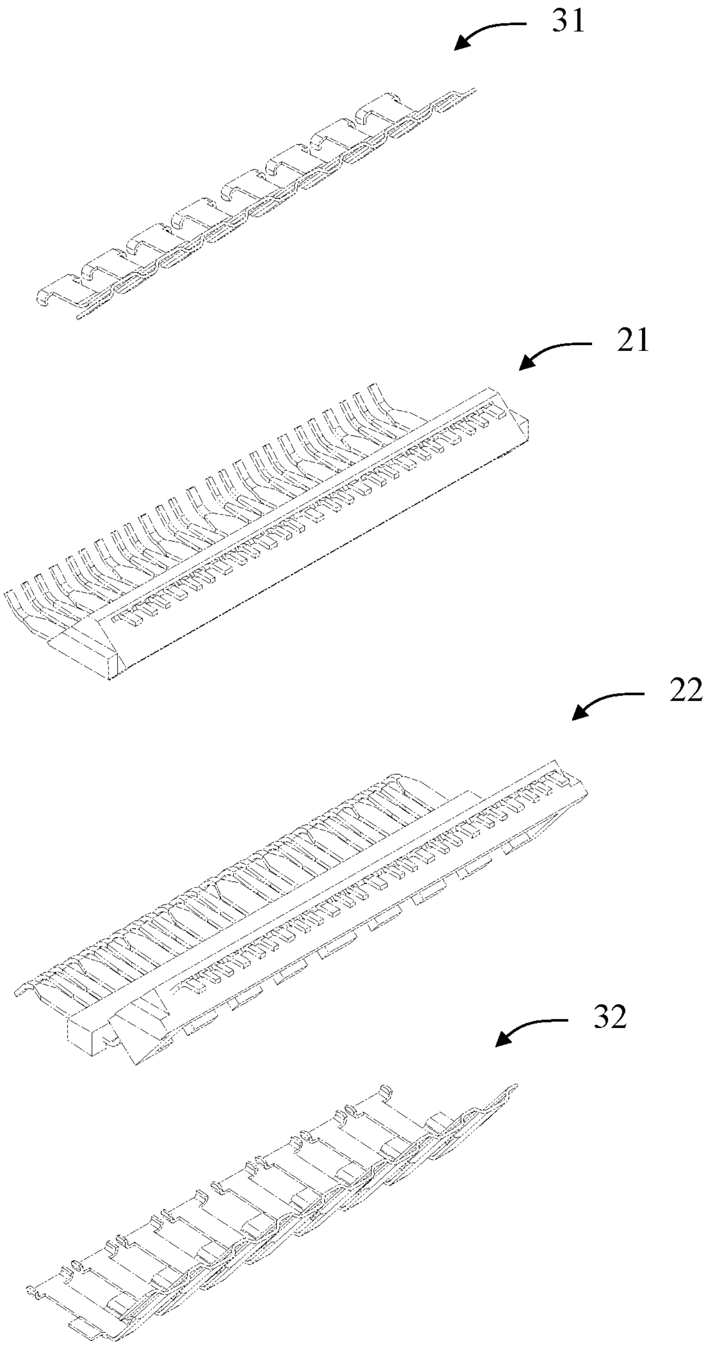
FIG. 8 is a partial perspective exploded view of FIG. 6.
Figure 9:
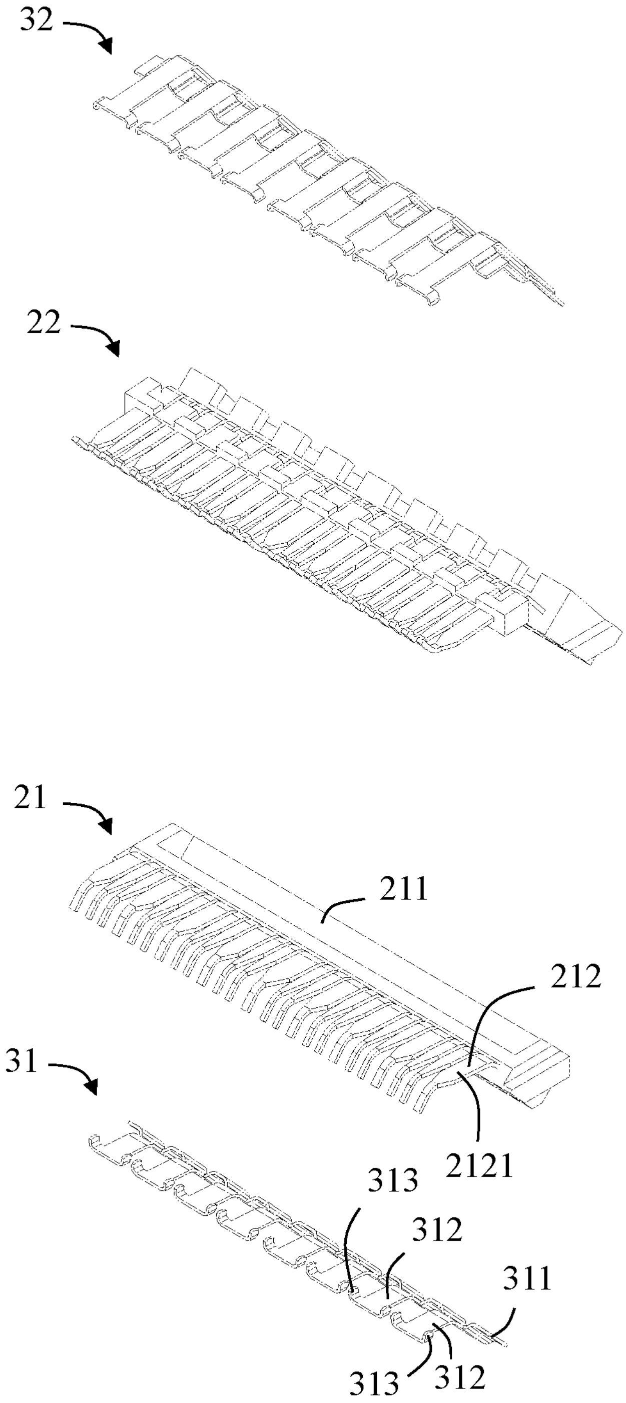
FIG. 9 is a partially exploded perspective view of FIG. 8 from another angle.

The mating module 300 is a mating circuit board or a mating connector. In the embodiment shown in the present disclosure, the mating module 300 is a mating circuit board. The mating circuit board includes a plurality of mating conductive pads 301 on upper and lower surfaces thereof Referring to FIGS. 2 and 3, the electrical connector 100 includes an insulating body 1, a terminal module 2 mounted to the insulating body 1, and a shielding piece 3 matched with the terminal module 2. In the embodiment shown in the present disclosure, the insulating body 1 includes a mating surface 11 at a front end of the insulating body 1 and a mounting surface 12 at a bottom of the insulating body 1. The insulating body 1 further includes a mating slot 110 extending forwardly through the mating surface 11. The mating slot 110 is configured to receive the mating circuit board. The mounting surface 12 is configured for being mounted on the upper surface 201 of the circuit board 200.

Referring to FIGS. 4 to 13, in the embodiment shown in the present disclosure, the terminal module 2 includes a first terminal module 21 (e.g., a lower terminal module) and a second terminal module 22 (e.g., an upper terminal module). The first terminal module 21 includes an insulating block 211 and a plurality of conductive terminals 212 fixed to the insulating block 211. In the embodiment shown in the present disclosure, the conductive terminals 212 are insert-molded with the insulating block 211. Of course, in other embodiments, the conductive terminals 212 may also be fixed to the insulating block 211 by means of assembly or the like. The present disclosure does not limit the manner in which the conductive terminals 212 are fixed to the insulating block 211.

Figure 10:
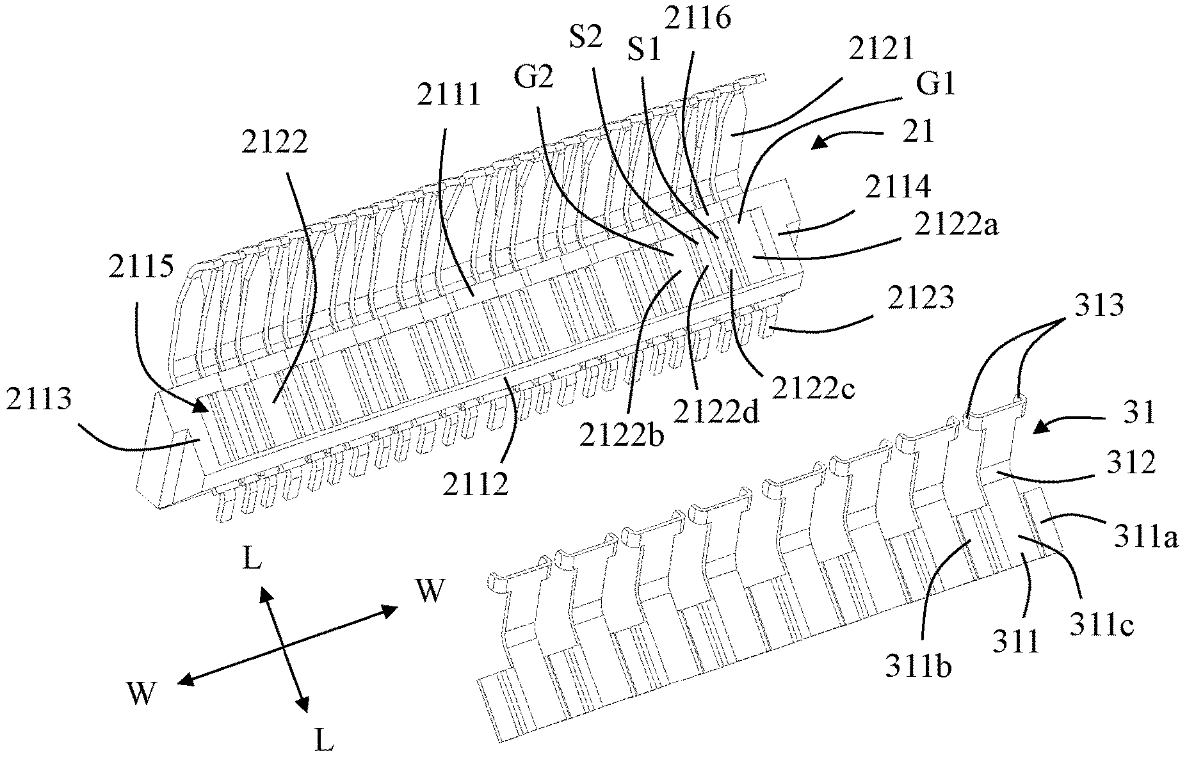
FIG. 10 is a schematic perspective view of a first terminal module and a first shielding piece when separated.
Figure 11:
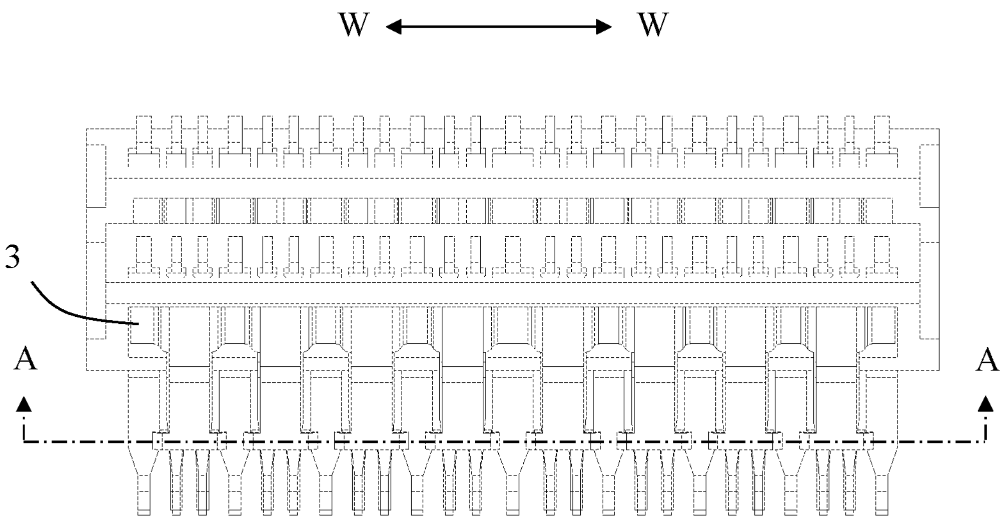
FIG. 11 is a top view of the terminal module and shielding piece in FIG. 5.

Referring to FIG. 10, the insulating block 211 includes a first wall portion 2111, a second wall portion 2112 opposite to the first wall portion 2111, a first side wall 2113 connecting one side of the first wall portion 2111 and one side of the second wall portion 2112, a second side wall 2114 connecting the other side of the first wall portion 2111 and the other side of the second wall portion 2112, and a mounting groove 2115 surrounded by the first wall portion 2111, the second wall portion 2112, the first side wall 2113 and the second side wall 2114. In the illustrated embodiment of the present disclosure, the mounting groove 2115 is substantially rectangular. The first wall portion 2111 is further provided with a plurality of positioning grooves 2116 which are spaced from each other along a width direction W-W of the insulating block 211.

Each conductive terminal 212 includes a mating elastic arm 2121 extending beyond the insulating block 211 so as to extend into the mating slot 110, a body portion 2122 exposed in the mounting groove 2115, and a tail portion 2123 extending beyond the insulating block 211.

Figure 12:
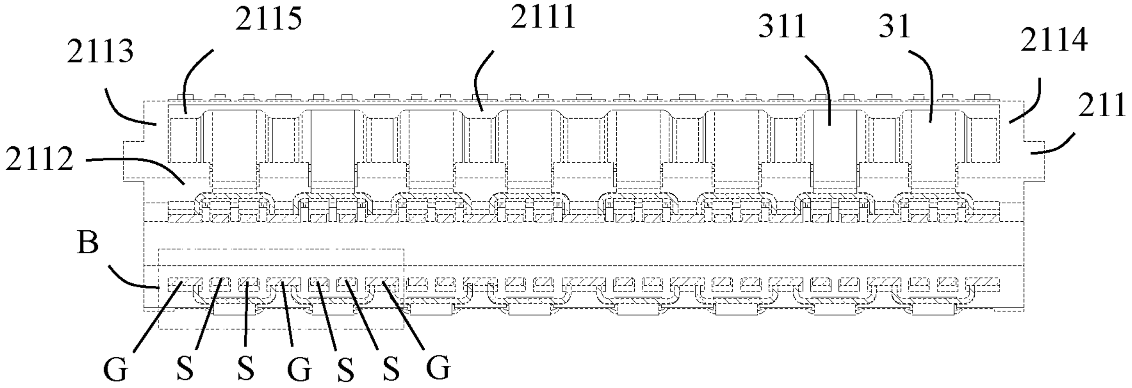
FIG. 12 is a schematic cross-sectional view taken along line A-A in FIG. 11.
Figure 13:
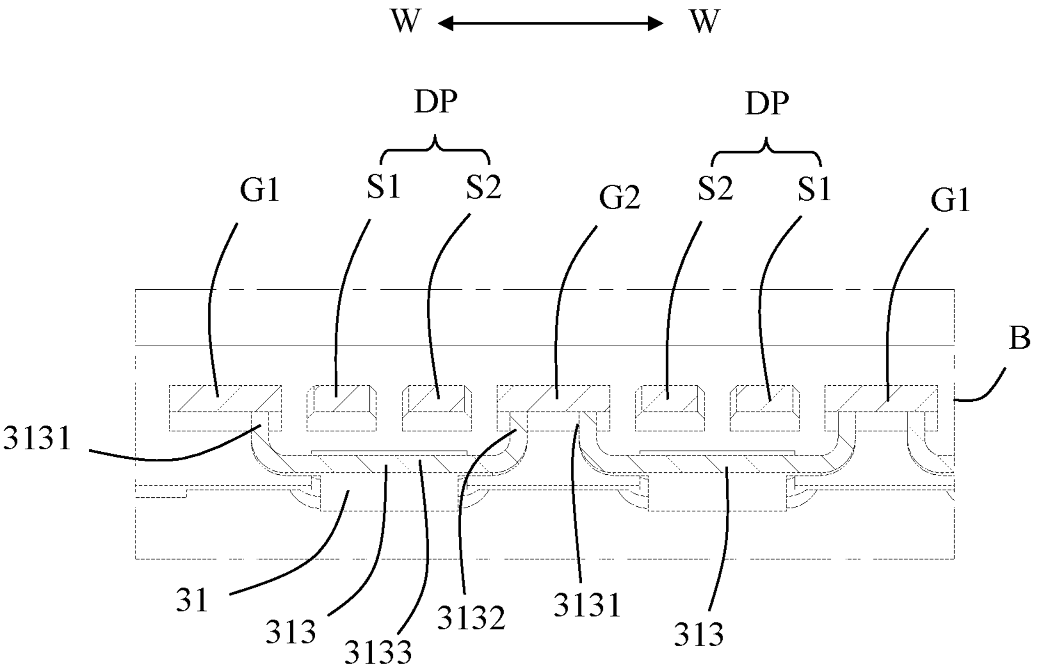
FIG. 13 is a partial enlarged view of a frame portion B in FIG. 12.
Figure 14:
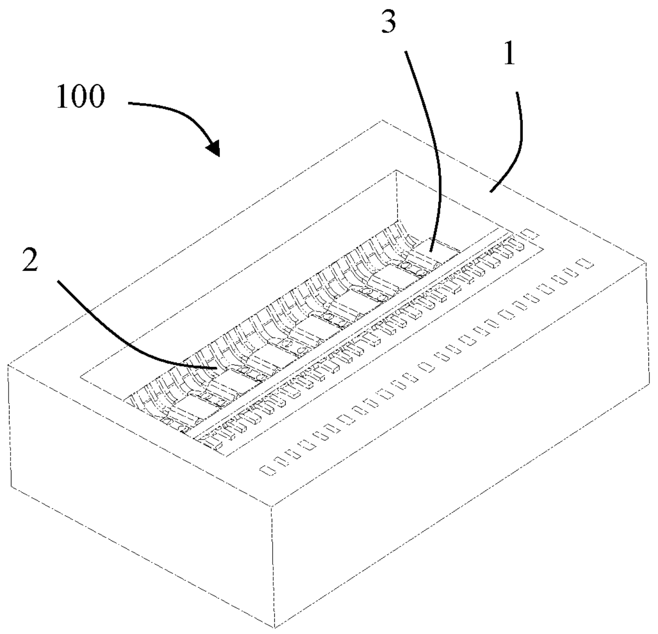
FIG. 14 is a schematic perspective view of the electrical connector in accordance with another embodiment of the present disclosure.
Figure 15:
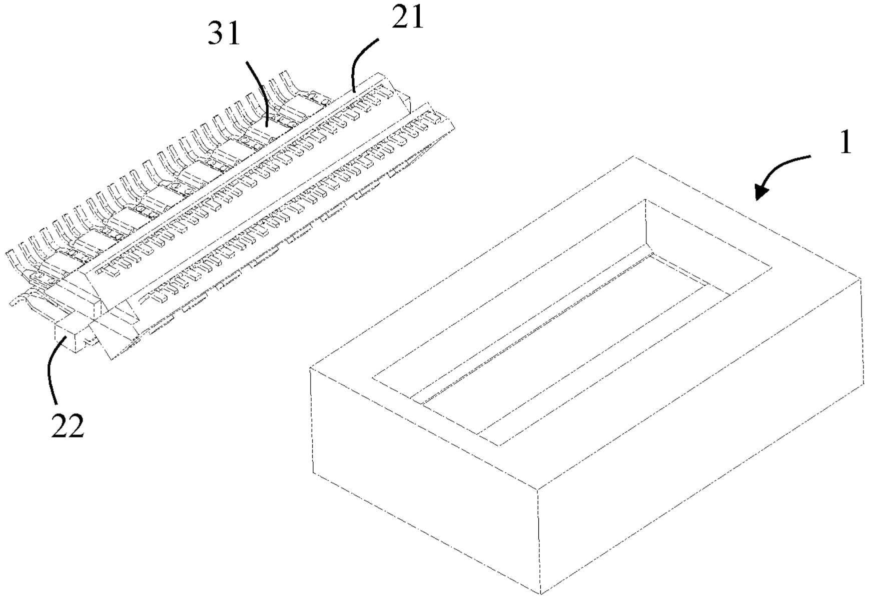
FIG. 15 is a partially exploded perspective view of FIG. 14.
Figure 16:
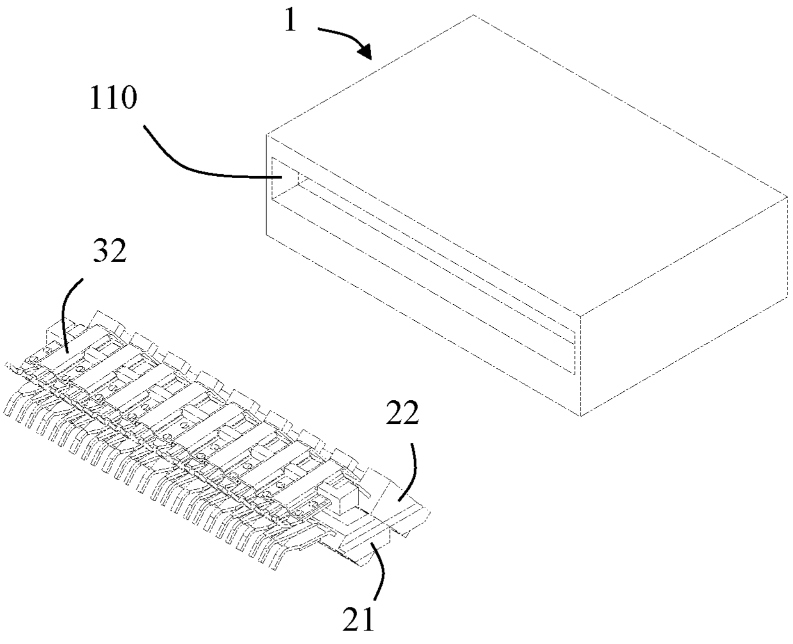
FIG. 16 is a partially exploded perspective view of FIG. 15 from another angle.
Figure 17:
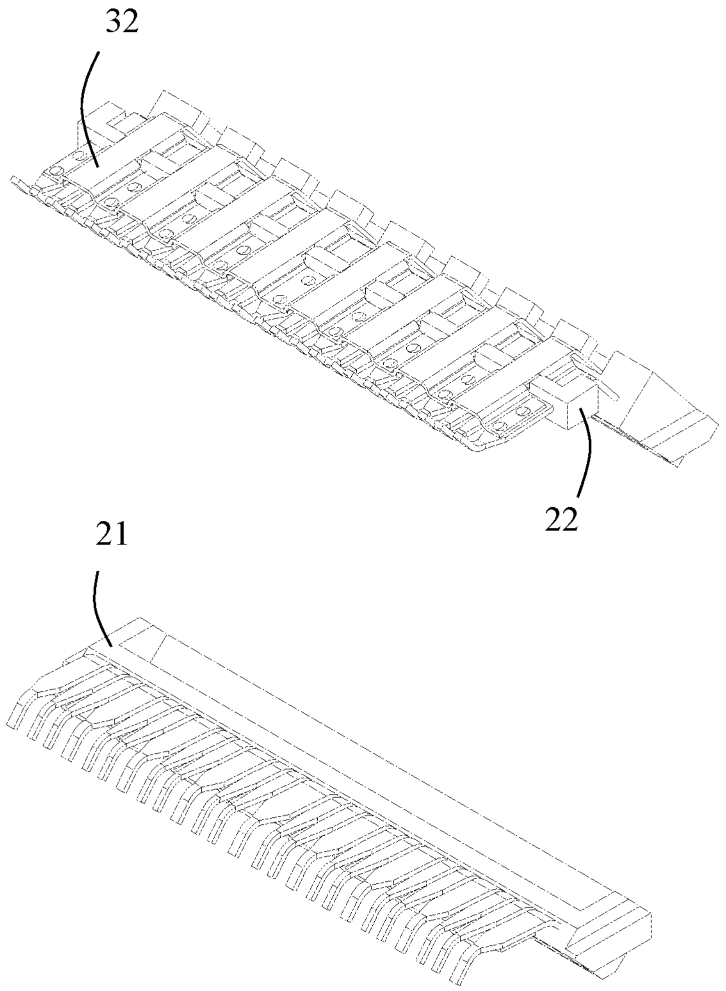
FIG. 17 is a perspective view of the terminal module and the shielding piece in FIG. 16.
Figure 18:
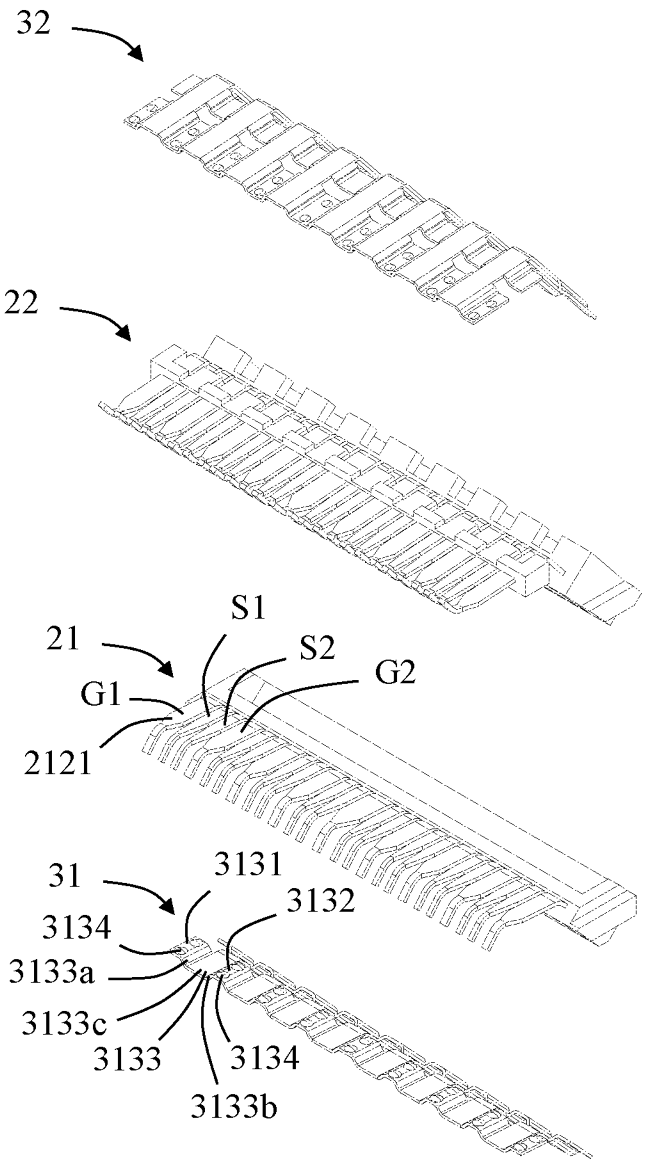
FIG. 18 is a partial perspective exploded view of FIG. 17.
Figure 19:
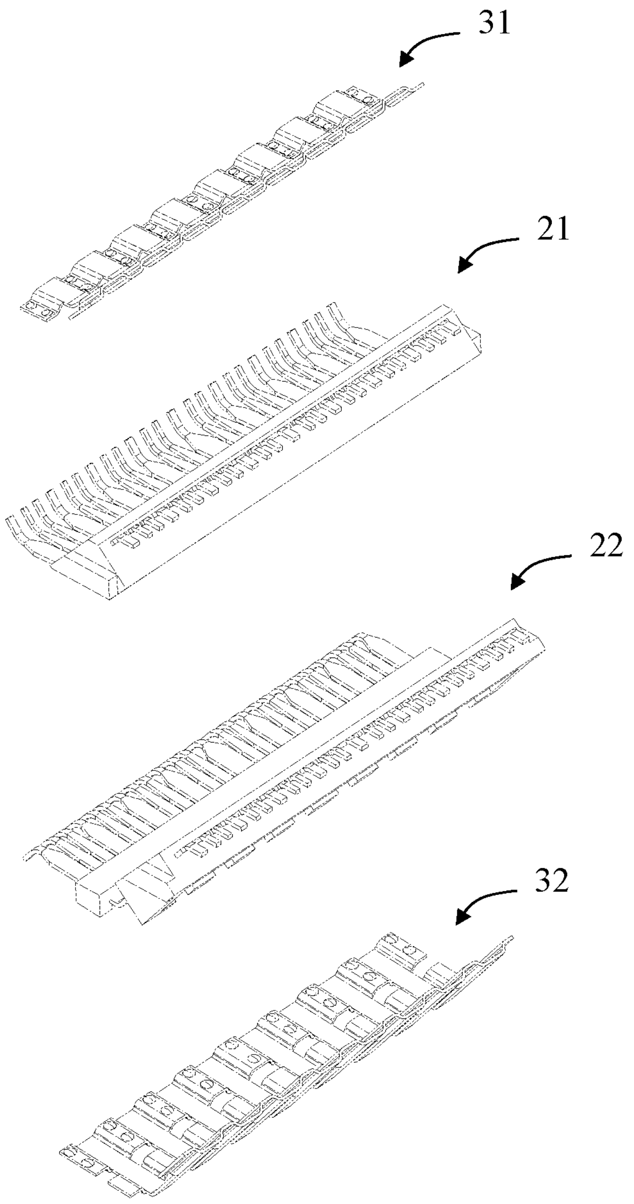
FIG. 19 is a partially exploded perspective view of FIG. 18 from another angle.
Figure 20:
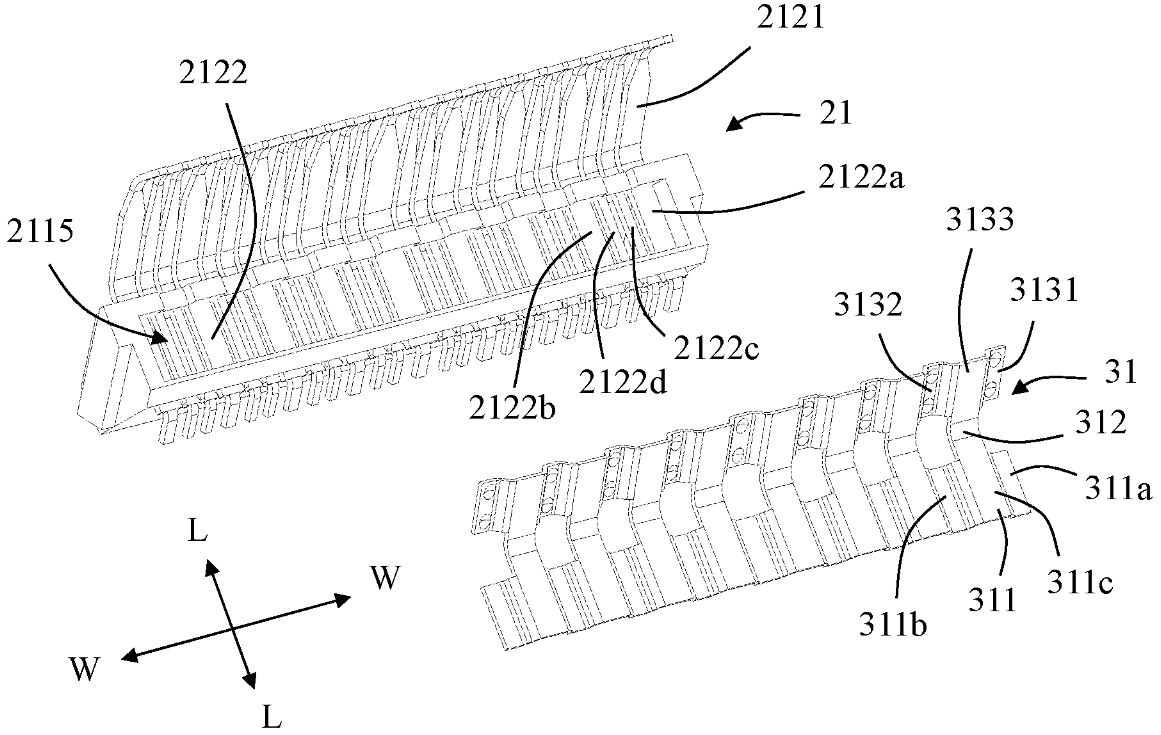
FIG. 20 is a schematic perspective view of the first terminal module and the first shielding piece of FIG. 18 when they are separated.
Figure 21:
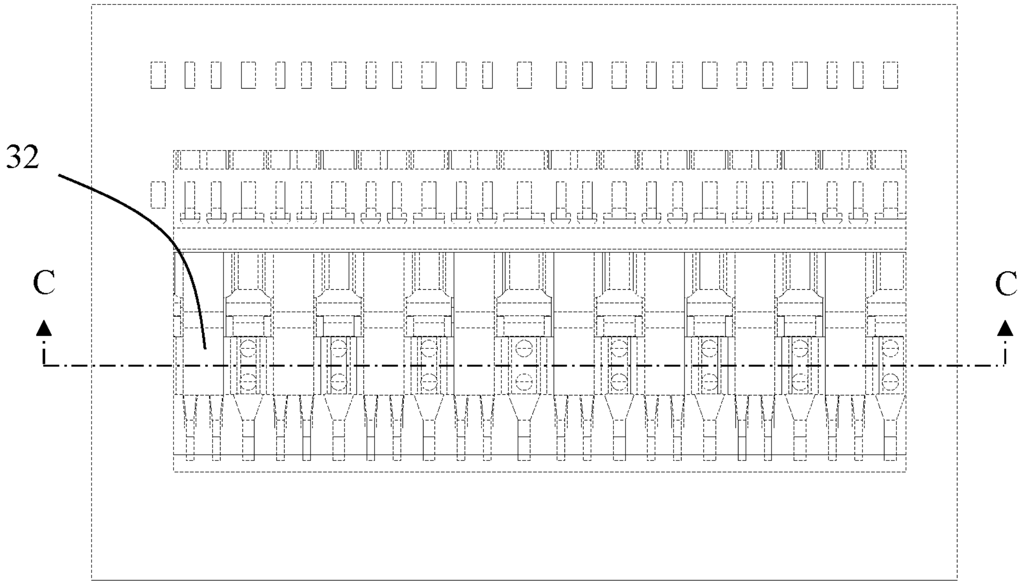
FIG. 21 is a top view of FIG. 14.
Figure 22:
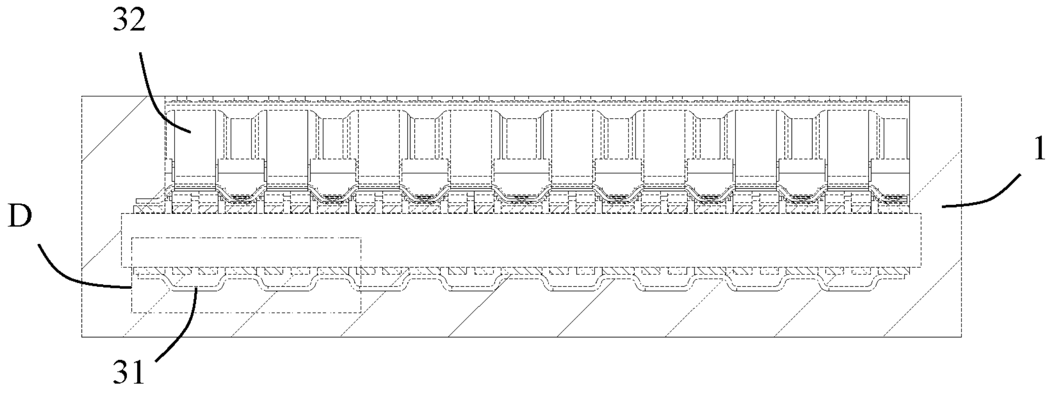
FIG. 22 is a schematic cross-sectional view taken along line C-C in FIG. 21.
Figure 23:
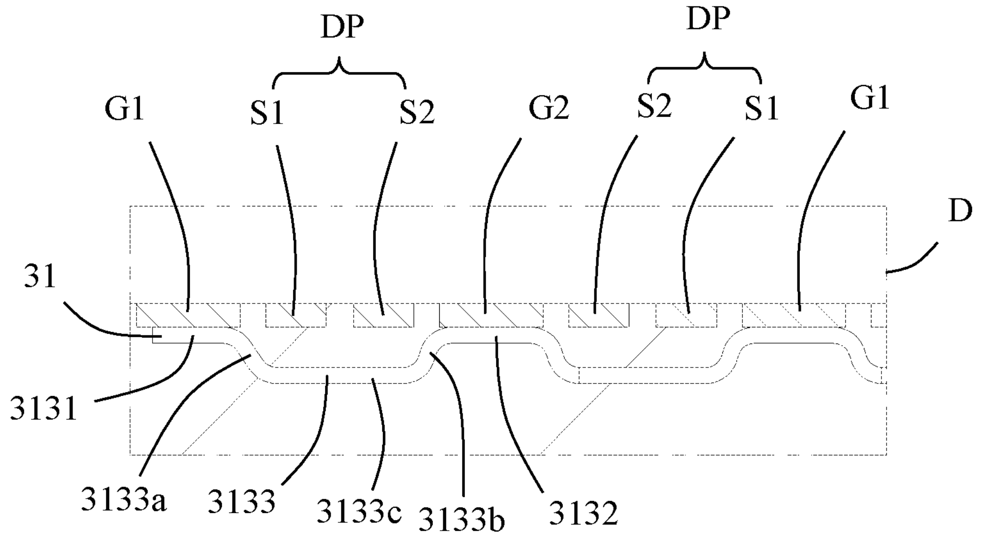
FIG. 23 is a partial enlarged view of a frame portion Din FIG. 22.

Referring to FIGS. 12 and 13, specifically, the plurality of conductive terminals 212 include a first signal terminal S1, a second signal terminal S2, a first ground terminal G1 located on one side of the first signal terminal S1 and adjacent to the first signal terminal S1, and a second ground terminal G2 located on one side of the second signal terminal S2 and adjacent to the second signal terminal S2. The first signal terminal S1 and the second signal terminal S2 form a differential pair signal terminal DP (Differential Pair). The differential pair signal terminal DP is located between the first ground terminal G1 and the second ground terminal G2 to improve the quality of signal transmission. In order to facilitate understanding of the present disclosure, the superordinate concept of the first ground terminal G1 and the second ground terminal G2 is a ground terminal G. The superordinate concept of the first signal terminal S1 and the second signal terminal S2 is a signal terminal S. In the embodiment shown in the present disclosure, a plurality of differential pair signal terminals DP are provided, a plurality of first ground terminals G1 are provided, and a plurality of the second ground terminals G2 are provided. The plurality of conductive terminals 212 are arranged in a manner of G-S-S-G along the width direction W-W. Two adjacent differential pair signal terminals DP share a single ground terminal G which is located between the two adjacent differential pair signal terminals DP. The ground terminal G is the first ground terminal G1 or the second ground terminal G2.

Referring to FIG. 10, the body portion 2122 includes a first body portion 2122*a* disposed on the first ground terminal G1 and exposed in the mounting groove 2115, a second body portion 2122*b* disposed on the second ground terminal G2 and exposed in the mounting groove 2115, a third body portion 2122*c* disposed on the first signal terminal S1 and exposed in the mounting groove 2115, and a fourth body portion 2122*d* disposed on the second signal terminal S2 and exposed in the mounting groove 2115. A width of the first body portion 2122*a* of the first ground terminal G1 along the width direction W-W is greater than a width of the third body portion 2122*c* of the first signal terminal S1 along the width direction W-W. The width of the first body portion 2122*a* of the first ground terminal G1 along the width direction W-W is greater than a width of the fourth body portion 2122*d* of the second signal terminal S2 along the width direction W-W. A width of the second body portion 2122*b* of the second ground terminal G2 along the width direction W-W is greater than a width of the third body portion 2122*c* of the first signal terminal S1 along the width direction W-W. The width of the second body portion 2122*b* of the second ground terminal G2 along the width direction W-W is greater than a width of the fourth body portion 2122*d* of the second signal terminal S2 along the width direction W-W. In the embodiment shown in the present disclosure, each of a width of the mating elastic arm 2121 of the first ground terminal G1 along the width direction W-W and a width of the mating elastic arm 2121 of the second ground terminal G2 along the width direction W-W is larger than a width of the mating elastic arm 2121 of the first signal terminal S1 along the width direction W-W, and is also larger than a width of the mating elastic arm 2121 of the second signal terminal S2 along the width direction W-W. Similarly, in the embodiment shown in the present disclosure, each of a width of the tail portion 2123 of the first ground terminal G1 along the width direction W-W and a width of the tail portion 2123 of the second ground terminal G2 along the width direction W-W is greater than a width of the tail portion 2123 of the first signal terminal S1 along the width direction W-W, and is also greater than the width of the tail portion 2123 of the second signal terminal S2 along the width direction W-W. In this way, by widening the first ground terminal G1 and the second ground terminal G2, it is beneficial to increase the shielding area and improve the shielding effect.

The second terminal module 22 is similar to the first terminal module 21, and includes two second insulating blocks 221 and a plurality of second conductive terminals 222 fixed to the second insulating blocks 221. The second conductive terminals 222 of the second terminal module 22 are similar to the conductive terminals 212 of the first terminal module 21, which will not be repeated in the present disclosure.

The shielding piece 3 includes a first shielding piece 31 mounted to the first terminal module 21 and a second shielding piece 32 mounted to the second terminal module 22. The structure of the second shielding piece 32 is similar to that of the first shielding piece 31, and the following only takes the first shielding piece 31 as an example for detailed description.

Referring to FIGS. 10 and 13, the first shielding piece 31 is made of metal material, and includes a base portion 311, a plurality of elastic arm portions 312 extending from the base portion 311, and a plurality of abutting portions 313 connected with the plurality of elastic arm portions 312. In the illustrated embodiment of the present disclosure, the base portion 311 extends obliquely relative to the elastic arm portions 312. The plurality of elastic arm portions 312 are arranged at intervals along the width direction W-W. The plurality of abutting portions 313 are arranged at intervals along the width direction W-W. The base portion 311 is at least partially received in the mounting groove 2115. The base portion 311 includes a first fixing portion 311*a* fixed to the first body portion 2122*a* of the first ground terminal G1, a second fixing portion 311*b* fixed to the second body portion 2122*b* of the second ground terminal G2, and a raised portion 311*c* connecting the first fixing portion 311*a* and the second fixing portion 311*b*. The raised portion 311*c* is spanned over the third body portion 2122*c* of the first signal terminal S1 and the fourth body portion 2122*d* of the second signal terminal S2, so that the raised portion 311*c* will not be in contact with the first signal terminal S1 and the second signal terminal S2 to avoid short circuit.

The insulating block 211 includes a length direction L-L perpendicular to the width direction W-W, wherein the base portion 311 of the shielding piece 3 completely covers the first body portion 2122*a*, the second body portion 2122*b*, the third body portion 2122*c* and the fourth body portion 2122*d* along the length direction L-L to achieve better shielding effect.

In the illustrated embodiment of the present disclosure, the elastic arm portion 312 is integrally formed by extending from the raised portion 311*c*. The elastic arm portion 312 at least partially extends beyond the insulating block 211 so as to have a certain elastic deformation capability. The abutting portion 313 includes a first abutting portion 3131 floating in abutment against the mating elastic arm 2121 of the first ground terminal G1, and a second abutting portion 3132 floating in abutment against the mating elastic arm 2121 of the second ground terminal G2. The elastic arm portion 312, the first abutting portion 3131 and the second abutting portion 3132 are deformable with the deformation of the mating elastic arm 2121 of the first ground terminal G1 and the mating elastic arm 2121 of the second ground terminal G2. The ground terminal G is in contact with two adjacent abutting portions 313 to achieve better series connection.

In the embodiment shown in the present disclosure, the first fixing portion 311*a* is fixed to the first body portion 2122*a* of the first grounding terminal G1 by soldering or welding, and the second fixing portion 311*b* is fixed to the second body portion 2122*b* of the second ground terminal G2 by soldering or welding, so as to improve reliability.

The abutting portion 313 is located at a free end of the elastic arm portion 312 to have better elasticity. The abutting portion 313 further includes a bridging portion 3133 connecting the first abutting portion 3131 and the second abutting portion 3132. The first abutting portion 3131, the second abutting portion 3132 and the bridging portion 3133 form a U-shape configuration. The bridging portion 3133 is spanned over the mating elastic arm 2121 of the first signal terminal S1 and the mating elastic arm 2121 of the second signal terminal S2. The abutting portion 313 is not in contact with the first signal terminal S1 and the second signal terminal S2 so as to avoid short circuit.

Referring to FIGS. 7 to 10, in the first embodiment of the present disclosure, the first abutting portion 3131 includes a first arc-shaped surface 3131*a* floating in abutment against the mating elastic arm 2121 of the first ground terminal G1; and the second abutting portion 3132 includes a second arc-shaped surface 3132*a* floating in abutment against the mating elastic arm 2121 of the second ground terminal G2. By providing the first arc-shaped surface 3131*a* and the second arc-shaped surface 3132*a*, it is beneficial to reduce the scraping between the first abutting portion 3131 and the mating elastic arm 2121 of the first ground terminal G1, and to reduce the scraping between the second abutting portion 3132 and the mating elastic arm 2121 of the second ground terminal G2. As a result, the elastic deformation ability of the mating elastic arm 2121 of the first ground terminal G1 and the mating elastic arm 2121 of the second ground terminal G2 is not affected.

The elastic arm portion 312 of the first shielding piece 31 is held in the positioning groove 2116 to prevent the elastic arm portion 312 from shaking from side to side.

Referring to FIGS. 14 to 23, in the second embodiment of the present disclosure, the first abutting portion 3131 and the second abutting portion 3132 are both flat plates, and the bridging portion 3133 is generally U-shaped. The first abutting portion 3131, the second abutting portion 3132 and the bridging portion 3133 are generally S-shaped as a whole. The bridging portion 3133 includes a first connecting wall 3133*a* connected to the first abutting portion 3131, a second connecting wall 3133*b* connected to the second abutting portion 3132, and a raised wall 3133*c* connecting the first connecting wall 3133*a* and the second connecting wall 3133*b*. The raised wall 3133*c* is parallel to the first abutting portion 3131 and the second abutting portion 3132. Both the first abutting portion 3131 and the second abutting portion 3132 are provided with dimples 3134 in contact with the mating elastic arm 2121 of the first ground terminal G1 and the mating elastic arm 2121 of the second ground terminal G2, respectively. By providing the dimples 3134, it is beneficial to reduce the scraping between the first abutting portion 3131 and the mating elastic arm 2121 of the first ground terminal G1, and to reduce the scraping between the second abutting portion 3132 and the mating elastic arm 2121 of the second ground terminal G2. As a result, the elastic deformation ability of the mating elastic arm 2121 of the first ground terminal G1 and the mating elastic arm 2121 of the second ground terminal G2 is not affected.

The shielding piece 3 of the present disclosure is provided with the first fixing portion 311*a* fixed to the first body portion 2122*a* of the first ground terminal G1 and the second fixing portion 311*b* fixed to the second body portion 2122*b* of the second ground terminal G2, thereby improving the shielding of the differential pair signal terminals DP in areas corresponding to the first body portion 2122*a* and the second body portion 2122*b*. In addition, the abutting portion 313 of the shielding piece 3 includes the first abutting portion 3131 floating in abutment against the mating elastic arm 2121 of the first ground terminal G1 and the second abutting portion 3132 floating in abutment against the mating elastic arm 2121 of the second ground terminal G2, thereby strengthening the shielding of the differential pair signal terminals DP in the area corresponding to the mating elastic arms 2121. Compared with the prior art, the shielding piece 3 of the present disclosure can provide a shielding section covering a longer distance, thereby improving the shielding effect.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface and a mating slot extending through the mating surface;

a terminal module comprising an insulating block and a plurality of conductive terminals fixed to the insulating block, the insulating block comprising a mounting groove, each conductive terminal comprising a mating elastic arm extending beyond the insulating block so as to extend into the mating slot, the plurality of conductive terminals comprising a first signal terminal, a second signal terminal, a first ground terminal located on one side of the first signal terminal and adjacent to the first signal terminal, and a second ground terminal located on another side of the second signal terminal and adjacent to the second signal terminal, the first signal terminal and the second signal terminal forming a differential pair signal terminals, the differential pair signal terminals are located between the first ground terminal and the second ground terminal, the first ground terminal comprising a first body portion exposed in the mounting groove, the second ground terminal comprising a second body portion exposed in the mounting groove; and a shielding piece comprising a base portion, an elastic arm portion extending from the base portion, and an abutting portion connected with the elastic arm portion, the base portion being at least partially received in the mounting groove, the base portion comprising a first fixing portion fixed to the first body portion of the first ground terminal, a second fixing portion fixed to the second body portion of the second ground terminal, and a raised portion connecting the first fixing portion and the second fixing portion, the raised portion being spanned over the first signal terminal and the second signal terminal so that the raised portion is not in contact with the first signal terminal and the second signal terminal, the elastic arm portion at least partially extending beyond the insulating block, the abutting portion comprises a first abutting portion floating in abutment against the mating elastic arm of the first ground terminal, and a second abutting portion floating in abutment against the mating elastic arm of the second ground terminal; the elastic arm portion, the first abutting portion and the second abutting portion are deformable with the deformation of the mating elastic arm of the first ground terminal and the mating elastic arm of the second ground terminal.

2. The electrical connector according to claim 1, wherein the first fixing portion is fixed to the first body portion of the first ground terminal by soldering or welding; and the second fixing portion is fixed to the second body portion of the second ground terminal by soldering or welding.

3. The electrical connector according to claim 1, wherein the abutting portion is located at a free end of the elastic arm portion, the abutting portion comprises a bridging portion connecting the first abutting portion and the second abutting portion, the bridging portion is spanned over the mating elastic arm of the first signal terminal and the mating elastic arm of the second signal terminal, the abutting portion is not in contact with the first signal terminal and the second signal terminal.

4. The electrical connector according to claim 3, wherein the first abutting portion, the second abutting portion and the bridging portion form a U-shaped configuration; and the first abutting portion and the second abutting portion are perpendicular to the bridging portion.

5. The electrical connector according to claim 1, wherein the first abutting portion comprises a first arc-shaped surface floating in abutment against the mating elastic arm of the first ground terminal; and the second abutting portion comprises a second arc-shaped surface floating in abutment against the mating elastic arm of the second ground terminal.

6. The electrical connector according to claim 1, wherein the first abutting portion and the second abutting portion are both flat-plate-shaped; both the first abutting portion and the second abutting portion are provided with dimples in contact with the mating elastic arm of the first ground terminal and the mating elastic arm of the second ground terminal, respectively.

7. The electrical connector according to claim 1, wherein the elastic arm portion of the shielding piece is integrally formed by extending from the raised portion.

8. The electrical connector according to claim 1, wherein the insulating block comprises a first wall portion and a second wall portion opposite to the first wall portion, the mounting groove is located between the first wall portion and the second wall portion, the mating elastic arm of each conductive terminal extends beyond the first wall portion, the first wall portion is provided with a positioning groove, and the elastic arm portion of the shielding piece is secured in the positioning groove.

9. The electrical connector according to claim 8, wherein the plurality of conductive terminals are arranged at intervals along a width direction of the insulating block, the first signal terminal comprises a third body portion exposed in the mounting groove, the second signal terminal comprises a fourth body portion exposed in the mounting groove, a width of the first body portion of the first ground terminal along the width direction is greater than a width of the third body portion of the first signal terminal along the width direction, the width of the first body portion of the first ground terminal along the width direction is greater than a width of the fourth body portion of the second signal terminal along the width direction, a width of the second body portion of the second ground terminal along the width direction is greater than a width of the third body portion of the first signal terminal along the width direction, and the width of the second body portion of the second ground terminal along the width direction is greater than a width of the fourth body portion of the second signal terminal along the width direction.

10. The electrical connector according to claim 9, wherein the insulating block comprises a length direction perpendicular to the width direction; and wherein the base portion of the shielding piece completely covers the first body portion, the second body portion, the third body portion and the fourth body portion.

11. The electrical connector according to claim 1, wherein the base portion extends obliquely with respect to the elastic arm portion.

12. The electrical connector according to claim 1, wherein a plurality of the differential pair signal terminals are provided, a plurality of the first ground terminals are provided, a plurality of the second ground terminals are provided; and wherein two adjacent differential pair signal terminals share a ground terminal located between the two adjacent differential pair signal terminals, and the ground terminal is the first ground terminal or the second ground terminal; and wherein a plurality of the elastic arm portions of the shielding piece are provided, a plurality of the abutting portions are provided, and the ground terminal is in contact with two adjacent abutting portions.

13. The electrical connector according to claim 1, wherein two terminal modules and two shielding pieces are provided, one of the two terminal modules and one of the two shielding pieces are disposed on one side of the mating slot, and a remaining one of the two terminal modules and a remaining one of the two shielding pieces are disposed on another side of the mating slot.

14. An electrical connector assembly, comprising:

an electrical connector, comprising:

an insulating body comprising a mating surface and a mating slot extending through the mating surface;

a terminal module comprising an insulating block and a plurality of conductive terminals fixed to the insulating block, the insulating block comprising a mounting groove, each conductive terminal comprising a mating elastic arm extending beyond the insulating block so as to extend into the mating slot, the plurality of conductive terminals comprising a first signal terminal, a second signal terminal, a first ground terminal located on one side of the first signal terminal and adjacent to the first signal terminal, and a second ground terminal located on another side of the second signal terminal and adjacent to the second signal terminal, the first signal terminal and the second signal terminal forming a differential pair signal terminals, the differential pair signal terminals are located between the first ground terminal and the second ground terminal, the first ground terminal comprising a first body portion exposed in the mounting groove, the second ground terminal comprising a second body portion exposed in the mounting groove; and a shielding piece comprising a base portion, an elastic arm portion and an abutting portion connected with the elastic arm portion, the base portion being at least partially received in the mounting groove, the base portion comprising a first fixing portion fixed to the first body portion of the first ground terminal, a second fixing portion fixed to the second body portion of the second ground terminal, and a raised portion connecting the first fixing portion and the second fixing portion, the raised portion being spanned over the first signal terminal and the second signal terminal so that the raised portion is not in contact with the first signal terminal and the second signal terminal, the elastic arm portion at least partially extending beyond the insulating block, the abutting portion comprises a first abutting portion floating in abutment against the mating elastic arm of the first ground terminal, and a second abutting portion floating in abutment against the mating elastic arm of the second ground terminal; and a mating module comprising a plurality of mating conductive pads;

when the mating module is inserted into the mating slot, the mating conductive pads abut against the mating elastic arms of the conductive terminals; wherein the elastic arm portion, the first abutting portion and the second abutting portion are deformable with the deformation of the mating elastic arm of the first ground terminal and the mating elastic arm of the second ground terminal.

15. The electrical connector assembly according to claim 14, wherein the first fixing portion is fixed to the first body portion of the first ground terminal by soldering or welding; and the second fixing portion is fixed to the second body portion of the second ground terminal by soldering or welding.

16. The electrical connector assembly according to claim 14, wherein the abutting portion is located at a free end of the elastic arm portion, the abutting portion comprises a bridging portion connecting the first abutting portion and the second abutting portion, the bridging portion is spanned over the mating elastic arm of the first signal terminal and the mating elastic arm of the second signal terminal, the abutting portion is not in contact with the first signal terminal and the second signal terminal.

17. The electrical connector assembly according to claim 14, wherein the insulating block comprises a first wall portion and a second wall portion opposite to the first wall portion, the mounting groove is located between the first wall portion and the second wall portion, the mating elastic arm of each conductive terminal extends beyond the first wall portion, the first wall portion is provided with a positioning groove, and the elastic arm portion of the shielding piece is secured in the positioning groove.

18. The electrical connector assembly according to claim 14, wherein the first abutting portion comprises a first arc-shaped surface floating in abutment against the mating elastic arm of the first ground terminal; and the second abutting portion comprises a second arc-shaped surface floating in abutment against the mating elastic arm of the second ground terminal.

19. The electrical connector assembly according to claim 14, wherein the first abutting portion and the second abutting portion are both flat-plate-shaped; both the first abutting portion and the second abutting portion are provided with dimples in contact with the mating elastic arm of the first ground terminal and the mating elastic arm of the second ground terminal, respectively.

20. The electrical connector assembly according to claim 14, wherein a plurality of the differential pair signal terminals are provided, a plurality of the first ground terminals are provided, a plurality of the second ground terminals are provided; and wherein two adjacent differential pair signal terminals share a ground terminal located between the two adjacent differential pair signal terminals, and the ground terminal is the first ground terminal or the second ground terminal; and wherein a plurality of the elastic arm portions of the shielding piece are provided, a plurality of the abutting portions are provided, and the ground terminal is in contact with two adjacent abutting portions.

* * * * *